(No Model.)
W. MEYER.
CURTAIN RACK.
No. 425,336. Patented Apr. 8, 1890.
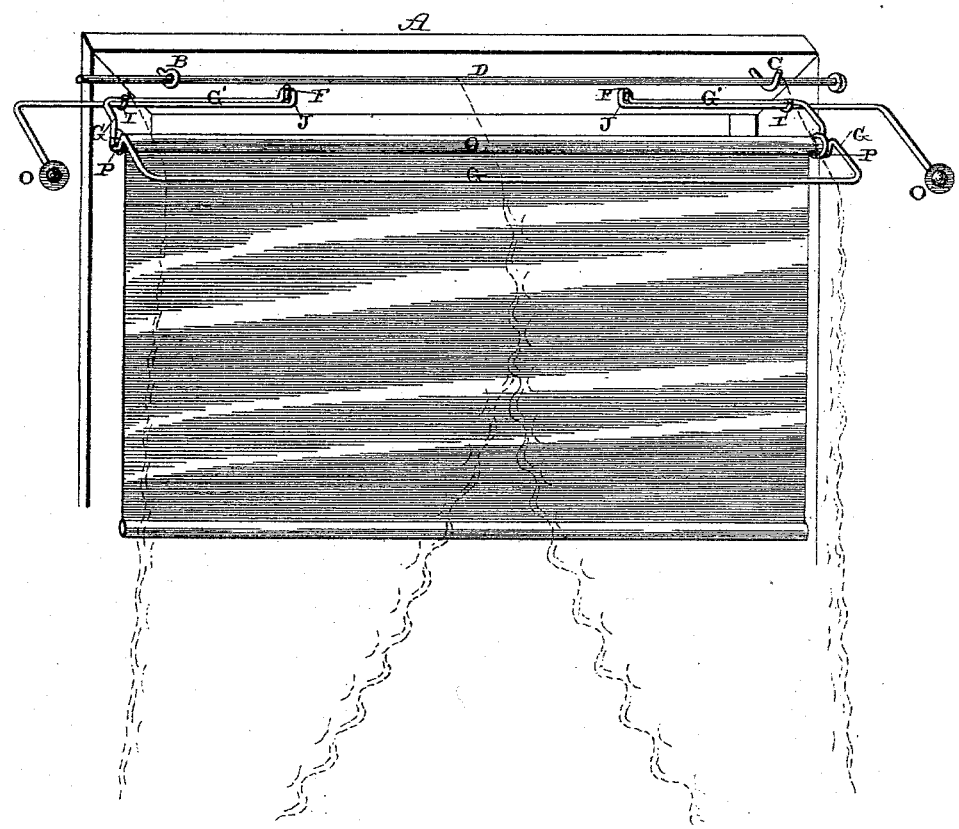
Witnesses:
E. P. Ellis,
J. M. Nesbit
Inventor:
Wm. Meyer.
per F. A. Lehmann,
Atty

UNITED STATES PATENT OFFICE.

WILLIAM MEYER, OF BEAVER FALLS, PENNSYLVANIA.

CURTAIN-RACK.

SPECIFICATION forming part of Letters Patent No. 425,336, dated April 8, 1890.

Application filed August 29, 1889. Serial No. 322,290. (No model.)

*To all whom it may concern:*

Be it known that I, WILLIAM MEYER, of Beaver Falls, in the county of Beaver and State of Pennsylvania, have invented certain new and useful Improvements in Curtain-Racks; and I do hereby declare the following to be a full, clear, and exact description of the invention, such as will enable others skilled in the art to which it pertains to make and use it, reference being had to accompanying drawings, which form part of this specification.

My invention relates to an improvement in curtain-racks; and it consists in the combination and arrangement of parts which will be more fully described hereinafter, and particularly pointed out in the claims.

The object of my invention is to provide a curtain-rack which will both support the curtain-roll and an inside curtain, and which may be used as a towel-rack when not in use as a curtain-rack.

The accompanying drawings is a perspective of a curtain-rack which embodies my invention complete.

A represents the top of the window-frame, and which has secured to its front side, near its upper edge, an eye B and a hook C. A needle or rod D, upon which the inside curtain is placed, is passed through this eye at one end and is supported by the hook C at the other. Secured to the front of this frame, upon each side of its center, is a hook F, around which the eyes J, formed by the inwardly-extending doubled portions G' of the frame G, pass. The frame G is doubled at each of its inner ends, as shown at G', and which are made to extend inward any desired distance, and their inner ends supported by the hooks F and resting upon the hooks I at the inner corners of the rectangular frame G, which extends outward any desired distance from the window-frame. When the eyes J are placed on the hooks F, their lower portions rest against the window-frame, as shown, which forms a stop and prevents the doubled portions G' from turning. By forming the doubled portions G' and hanging their inner ends upon hooks F, as shown, the outer horizontal portion of the frame is supported in an upright position and prevented from dropping, as it would otherwise do. The two ends of the wire, out of which the frame G is formed, are made to project beyond the ends of the frame and are bent into any desired shape, so as to receive an ornament O, made of colored glass, upon their ends. The frame G is nearly as long as the frame A is wide, and is preferably shaped as shown, the ends of the frame G being bent downward, so as to form the bearings P for the journals of the curtain-roller Q. Upon this roller Q is to be rolled the usual window-curtain. The inside curtains are placed upon the needle D, then extend outward over the top of the frame G and the curtain-roller Q, and then dropped freely downward, as shown in dotted lines. By the construction here shown it will be seen that the frame G is removably attached to the upper end of the window-frame without any additional braces or supports of any kind, and that the curtain-roller is supported upon this frame, enabling the parts to be freely removed at will. To remove both of the curtains, it is only necessary to pull out the pin D and lift the roller Q from the top of the frame.

Having thus described my invention, I claim—

1. The combination, with the window-frame, and the inner and outer hooks F and I, secured thereto, of a frame consisting of the rectangular portion G, having its ends provided with curtain-roller bearings and its inner parallel portion doubled upon itself so as to form eyes which engage the inner hooks and resting at the inner corners of the frame upon the outer hooks, and the curtain-roller placed in the bearings, substantially as described.

2. The combination of the window-frame, the rectangular frame G, having its ends provided with curtain-roller bearings and its inner parallel portion doubled upon itself so as to form eyes, the inner hooks secured to the window-frame, which engage with the said eyes, the outer hooks which support the inner corners of the frame, the ends of the frame provided with curtain-roller bearings, the supports B C, secured to the window-frame, and the needle supported thereby, to which the inner curtain is secured, substantially as shown and described.

In testimony whereof I affix my signature in presence of two witnesses.

WILLIAM MEYER.

Witnesses:
J. P. SHULL,
LOUIS EDGAR.